(12) United States Patent
Sanor et al.

(10) Patent No.: US 11,769,303 B2
(45) Date of Patent: Sep. 26, 2023

(54) AUGMENTED REALITY AUTOMOTIVE ACCESSORY CUSTOMER COLLABORATIVE DESIGN AND DISPLAY

(71) Applicant: TOYOTA MOTOR ENGINEERING & MANUFACTURING NORTH AMERICA, INC., Plano, TX (US)

(72) Inventors: Anthony D. Sanor, Melissa, TX (US); Jazmieka Smith, Fairview, TX (US); David Kleiner, Plano, TX (US); Jamese Yarber, Carrollton, TX (US); Smail Haddad, Plano, TX (US); Jessica K. Gambhir, Lewisville, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 17/325,823

(22) Filed: May 20, 2021

(65) Prior Publication Data
US 2022/0188891 A1    Jun. 16, 2022

Related U.S. Application Data

(60) Provisional application No. 63/125,196, filed on Dec. 14, 2020.

(51) Int. Cl.
*G06T 19/00* (2011.01)
*G06F 30/15* (2020.01)
(Continued)

(52) U.S. Cl.
CPC .......... *G06T 19/006* (2013.01); *G06F 3/0482* (2013.01); *G06F 3/04847* (2013.01);
(Continued)

(58) Field of Classification Search
CPC .......... G06Q 30/0621; G06Q 30/0605; G06Q 30/0643; G06Q 30/0631; G06Q 10/101;
(Continued)

(56) References Cited

U.S. PATENT DOCUMENTS

| 7,353,192 B1 | 4/2008 | Ellis et al. |
| 8,547,401 B2 | 10/2013 | Mallinson et al. |

(Continued)

FOREIGN PATENT DOCUMENTS

| AU | 2016277761 | 7/2018 |
| CN | 110659568 A | 1/2020 |

(Continued)

OTHER PUBLICATIONS

Mustafa Atalar et al., New Augmented Reality Application in E-Commerce and M-Commerce, Oct. 1, 2017, IEEE Xplore, pp. 1-5 (Year: 2017).*

(Continued)

*Primary Examiner* — Tam T Tran
(74) *Attorney, Agent, or Firm* — HAYNES AND BOONE, LLP

(57) ABSTRACT

A system that allows customers to collaborate with vehicle accessory manufacturers to design accessories in an augmented reality environment. A customer decision making and purchasing experience is greatly improved when viewing a physical showroom model (or other real-world model) of a vehicle they intend to purchase and/or customize. The system allows the user to select and customize virtual accessories for the physical vehicle, then overlay those virtual accessories atop the physical vehicle in an augmented reality environment.

18 Claims, 15 Drawing Sheets

(51) Int. Cl.

| | |
|---|---|
| *G06F 3/0482* | (2013.01) |
| *G06T 17/20* | (2006.01) |
| *G06N 20/00* | (2019.01) |
| *G06N 5/04* | (2023.01) |
| *G06Q 30/0601* | (2023.01) |
| *G06V 20/20* | (2022.01) |
| *G06F 3/04847* | (2022.01) |
| *G06F 18/214* | (2023.01) |
| *G06F 111/16* | (2020.01) |
| *G06F 111/02* | (2020.01) |
| *G06F 111/18* | (2020.01) |
| *B62D 65/00* | (2006.01) |
| *G06Q 10/101* | (2023.01) |

(52) U.S. Cl.
CPC ............ *G06F 18/214* (2023.01); *G06F 30/15* (2020.01); *G06N 5/04* (2013.01); *G06N 20/00* (2019.01); *G06Q 30/0605* (2013.01); *G06Q 30/0621* (2013.01); *G06Q 30/0631* (2013.01); *G06Q 30/0643* (2013.01); *G06T 17/20* (2013.01); *G06V 20/20* (2022.01); *B62D 65/00* (2013.01); *G06F 2111/02* (2020.01); *G06F 2111/16* (2020.01); *G06F 2111/18* (2020.01); *G06Q 10/101* (2013.01); *G06T 2200/24* (2013.01); *G06V 2201/08* (2022.01)

(58) Field of Classification Search
CPC .... G06F 30/15; G06F 3/0482; G06F 3/04847; G06F 2111/16; G06F 2111/02; G06F 2111/18; G06T 19/006; G06T 2200/24; B62D 65/00
See application file for complete search history.

(56) References Cited

U.S. PATENT DOCUMENTS

| | | | | |
|---|---|---|---|---|
| 9,517,403 | B1* | 12/2016 | Kim | ........................ A63F 13/63 |
| 9,550,419 | B2 | 1/2017 | Habashima et al. | |
| 10,235,813 | B1 | 3/2019 | Brockman et al. | |
| 10,726,630 | B1 | 7/2020 | Duckworth et al. | |
| 2005/0171867 | A1 | 8/2005 | Doonan et al. | |
| 2005/0280185 | A1 | 12/2005 | Russell et al. | |
| 2007/0156540 | A1* | 7/2007 | Koren | ................ G06Q 30/0643 705/14.51 |
| 2008/0071559 | A1 | 3/2008 | Arrasvuori | |
| 2009/0008202 | A1* | 1/2009 | Dayton | ................... A45C 13/08 190/110 |
| 2011/0205242 | A1 | 8/2011 | Friesen | |
| 2015/0148930 | A1 | 5/2015 | Kumar et al. | |
| 2015/0154691 | A1* | 6/2015 | Curry | .................. G06Q 30/0631 705/27.2 |
| 2015/0169284 | A1* | 6/2015 | Quast | .................. G06F 16/9535 704/275 |
| 2017/0098272 | A1* | 4/2017 | Brockman | ......... G06Q 30/0625 |
| 2017/0132841 | A1 | 5/2017 | Morrison | |
| 2017/0165754 | A1 | 6/2017 | Buller et al. | |
| 2018/0053351 | A1 | 2/2018 | Anderson | |
| 2018/0225875 | A1 | 8/2018 | Yasrebi | |
| 2019/0279044 | A1 | 9/2019 | Vasisht et al. | |
| 2020/0358783 | A1* | 11/2020 | Beaver, III | .............. G06F 30/12 |
| 2021/0342790 | A1* | 11/2021 | Dagley | .................. G06F 16/787 |
| 2022/0300306 | A1* | 9/2022 | Leung | ................... G06F 9/4451 |

FOREIGN PATENT DOCUMENTS

| | | |
|---|---|---|
| KR | 20120065186 A | 6/2012 |
| WO | WO 2015/054818 A1 | 4/2015 |
| WO | WO 2016/146374 A1 | 9/2016 |
| WO | WO 2017/157589 A1 | 9/2017 |
| WO | WO 2019/030775 A1 | 2/2019 |

OTHER PUBLICATIONS

Hongyun Xiong et al., A Distributed Collaborative Product Customization System Based on Web3D, Apr. 1, 2007, IEEE Xplore, pp. 1-5 (Year: 2007).*

Blippar, "Turning US Streets Into Car Showrooms with Auto Recognition," May 25, 2017.

CarLens, a smartphone app that uses AI machine learning to instantly identify different cars on the street (https://laughingsquid.com/carlens-app-can-identify-cars/), accessed on Apr. 18, 2019.

Interactive Garage—Real World Customizations (https://www.interactivegarage.com/), accessed on Feb. 17, 2021.

KimKomando New app finds the make and model of any car it sees (https://www.komando.com/gadget/new-app-finds-the-make-andmodel-of-any-car-it-sees/402278/), accessed on May 29, 2017.

* cited by examiner

AUGMENTED REALITY AUTOMOTIVE ACCESSORY CUSTOMER COLLABORATIVE DESIGN AND DISPLAY

PRIORITY

The application is a non-provisional of and claims priority to U.S. Provisional Application No. 63/125,196, entitled "SYSTEMS AND METHODS FOR ENABLING PRECISE OBJECT INTERACTION WITHIN AN AUGMENTED REALITY ENVIRONMENT," filed on Dec. 14, 2020, naming the same inventors, the disclosure of which is hereby incorporated by reference in its entirety.

TECHNICAL FIELD

The present disclosure relates generally to systems and methods of augmented reality and, more particularly, to methods and systems for the collaborative design and display of vehicle accessories in an augmented reality environment.

BACKGROUND

Augmented reality (AR) systems provide a means for virtual objects to be presented in a real-world (physical) environment when the real-world environment is viewed through a device capable of capturing image data of the real-world environment and displaying the real-world environment on a user display device. Virtual objects presented in the real-world environment may be overlays presented to a user or as virtual objects presented to appear as real-world objects within the environment.

In the automotive industry, customers often desire to customize their vehicles with various accessories. However, typically these customers are forced to view the accessories in magazines or other images and are unable to view the accessory on the real-world vehicle. As a result, customers are often forced to make substantial investments in accessories without really knowing if they like the look on the accessories on their vehicles. In addition, those customers often lack the ability to customize the accessories as they desire. Ultimately, these shortcomings lead to increased customer dissatisfaction with the vehicle buying experience.

SUMMARY

The present disclosure provides systems and methods for collaborative customization of vehicle accessories in an augmented reality environment. A virtual automotive accessory is first obtained from a user via a graphical user interface. The virtual accessory corresponds to a physical real-world vehicle being viewed through the user device. In response to the user input, the system customizes the automotive accessory through customization of various characteristics of the accessory. Once customization is complete, the finalized design is displayed to the user in an augmented reality environment such that the physical vehicle appears to incorporate the customized automotive accessory.

A system for displaying vehicle accessories in an augmented reality environment is also described herein. The system includes a processor to perform operations comprising obtaining a selection of an automotive accessory corresponding to a physical vehicle. Thereafter, in response to user input, the automotive accessory is customized. The system then displays the customized automotive accessory to the user in an augmented reality environment such that the physical vehicle appears to incorporate the customized automotive accessory.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures.

DETAILED DESCRIPTION

Figure 1:
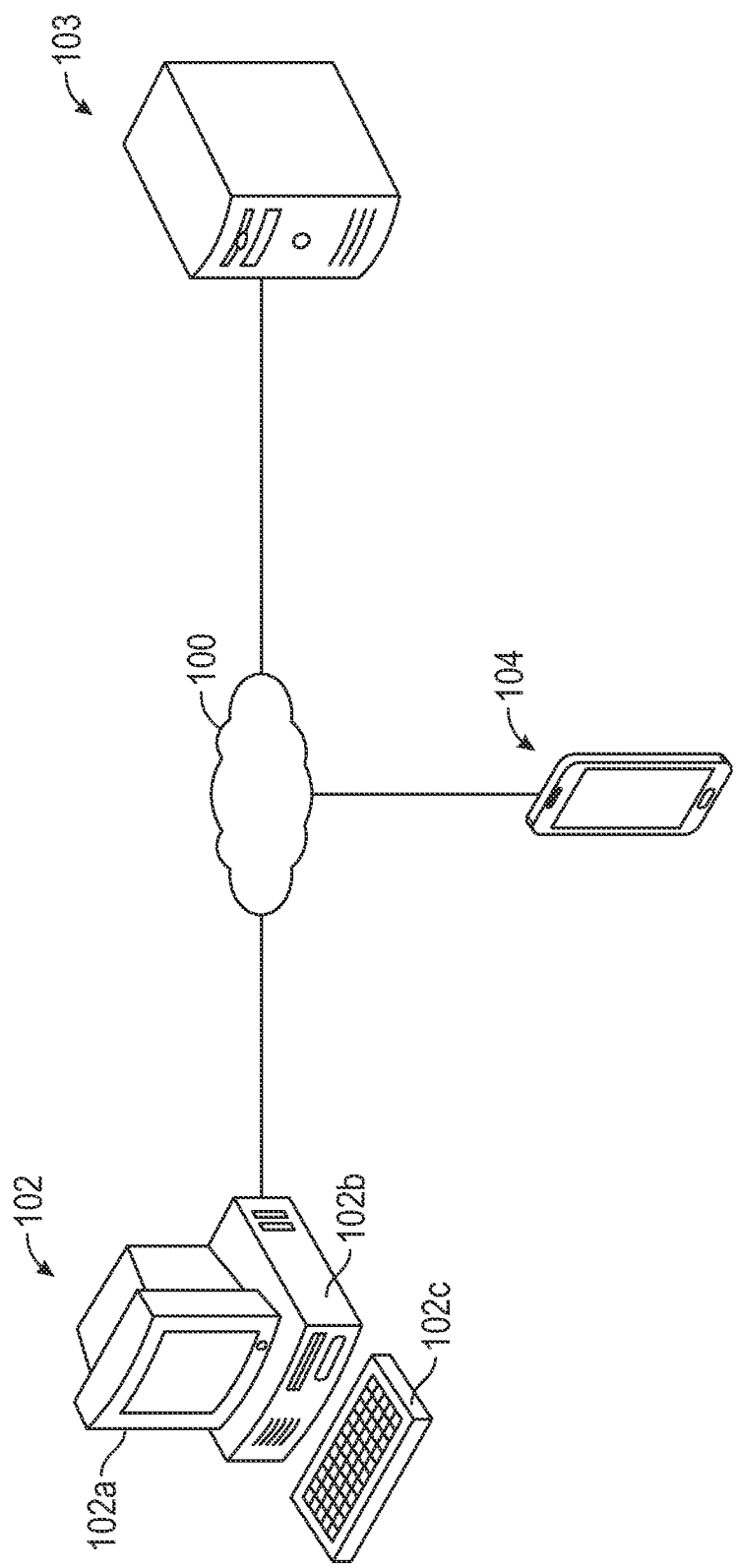
FIG. 1 schematically depicts an example computing network for providing an augmented reality system, according to one or more embodiments described and illustrated herein.

Illustrative embodiments and related methods of the present disclosure are described below as they might be employed in a system and method for collaborative design and display of vehicle accessories in an augmented reality environment. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methodologies of the disclosure will become apparent from consideration of the following description and drawings.

As will be described below, illustrative methods and embodiments of the present disclosure allow customers to collaborate with vehicle accessory manufacturers to design and display the accessories in an augmented reality environment. Embodiments described herein are generally related to improving a customer's decision making and purchasing experience when viewing a physical showroom model (or other real-world model) of a vehicle they intend to purchase and/or customize. For example, dealerships generally have only a few vehicles available for viewing in a showroom. However, there are generally many custom options and/or accessories that may be included on the vehicle to meet a customer's desired vehicle.

Typically, the accessory may be depicted on a computer in a fixed number of views so that the customer may get a sense for what the accessory would look like on their vehicle. However, this has several limitations. For example, the customer may wish to view multiple accessories together and get a better sense for how the one or more accessories appear when viewed from many angles which are not available on a small graphical model provided on a computer or in a brochure. Additionally, the user may want to switch between several options to find the one that best fits their taste. Further, tension can arise in the decision-making process because customers can be confronted with making decision to include an accessory that costs hundreds or thousands of dollars without really having a sense for what it would look like when installed on their vehicle.

Accordingly, embodiments of the present disclosure are directed to reducing or eliminating this tension by providing an augmented reality system that a user may deploy in a showroom or other location while viewing image data of a real vehicle through an electronic device and virtually customizing the vehicle with accessories while moving around the vehicle to view the virtualized accessory. The augmented reality system allows a user to select and customize the accessory, and then virtually install the accessory onto a real-world vehicle so the customer can see how the installed accessory looks and whether they would like to further customize the feature.

The system described herein also delivers a realistic experience to the user. The virtualized accessories must appear as realistic as possible and seamlessly integrate with the image data of the real-world vehicle. In general, graphic rendering for an augmented reality environment that fuses real-world image data with virtual features requires large amounts of graphics processing resources. However, these resources may not be available on conventional systems (e.g., handheld electronic devices) such as a smartphone that the user can practically bring into a showroom. Therefore, there is a need to provide a system and method that can deliver a comparable or better augmented reality experience on a handheld electronic device. Such a system and method are described herein.

Embodiments of the present disclosure provide an accurate, precise, and seamless presentation of one or more virtual accessories attached to an object identified within a real-world environment. In particular, the embodiments described herein provide systems and methods that identify a real-world object in an environment captured by an imaging device and register the identified object with a multi-dimensional wireframe model of the object so that virtualized accessories may be seamlessly associated with, or "locked onto," the real-world object in an augmented reality environment presented to a user on a display. Methods of identifying the real-world object and registering the identified object with the multi-dimensional wireframe model of the object will be described in detail herein.

It should be understood that, although the present disclosure describes the systems and methods for providing virtual accessories attached to physical vehicles, the technology described may be utilized in other contexts. The technology, for example, without limitation may be utilized in generating augmented reality environments for home building and/or renovation, clothing fitting, modeling and purchasing, and the like.

Embodiments described herein utilize a device such as a smartphone, laptop, tablet or other handheld computing device that includes an imaging device, a processor, memory, and a display. The imaging device may capture image data of an environment. The image data may be analyzed to identify one or more real-world objects within the environment. Moreover, to generate an augmented reality environment, the image data captured by the imaging device may be presented in real-time or near real-time on the display of the device. In some instances, the display may be the display of the device or may be a virtual reality headset or glasses.

The illustrative embodiments disclosed herein also describe systems and methods that utilize a trained machine learning model to identify real-world objects in an environment captured in the image data thereby facilitating precise interactions between virtual accessories and real-world objects within an augmented reality environment. More specifically, the augmented reality system described herein may utilize a trained machine learning model such as a neural network or other form of artificial intelligence system to identify a real-world object from image data captured by an imaging device.

As used herein, identifying a real-world object may refer to both the detection and classification of an object within the image data. Furthermore, a machine learning model may be implemented during registration of the multi-dimensional wireframe model of the identified object and the identified object captured in the image data being captured by the imaging device. For example, the machine learning model may be trained to identify whole objects and isolated features of an object so that registration of the isolated features of the object and the multidimensional wireframe model may be accurately and precisely mapped to each other. The multidimensional wireframe model may be a predefined computer aided model of the object. For example, the multi-dimensional wireframe model may be a three-dimensional spatial model that may appear as overlaying portions of an image or a live video stream of an object (e.g., a vehicle) within a physical environment. Moreover, the augmented reality system described herein may utilize the trained machine learning model to associate a virtual object (e.g., a virtual accessory) with a portion of the virtual wireframe model such that the virtual object may appear precisely positioned on or integrated with the object (e.g., a vehicle) within the physical environment.

The following will now describe certain illustrative systems and methods in more detail with reference to the drawings and where like numbers refer to like structures. FIG. 1 schematically depicts an example computing network for providing an augmented reality system, according to one or more embodiments described and illustrated herein. As illustrated in FIG. 1, a network 100 may include a wide area network, such as the internet, a local area network (LAN), a mobile communications network, a public service telephone network (PSTN) and/or other network and configured to electronically connect a computing device 102, a server 103 for managing content and training machine learning models, and an electronic device 104 enabled with an application for a user to use with a publication. The network 100 may be configured to electronically and/or communicatively connect the computing device 102, the server 103, and/or the electronic device 104.

The computing device 102 may include a display 102a, a processing unit 102b and an input device 102c, each of which may be communicatively coupled to together and/or to the network 100. The computing device 102 may be used to develop multi-dimensional wireframe models for objects such as vehicles and virtual accessories. The computing device 102 may also be utilized to interface with a server 103 to develop, update, and/or repair machine learning models for identifying object and/or defining and/or updating registration processes for registering (i.e., correctly aligning) the multi-dimensional model of an identified object with the identified object in the real-world as captured by the imaging device. The server 103 may be any computing device configured to store data, host internet-based applications, configured to be searchable by another device and/or the like. In some embodiments, the server 103 maintains a repository of current multi-dimensional wireframe models for objects such as a number of makes, models, and trims of vehicles and a plurality of virtual models for accessories of the same. The virtual models of accessories may include, for example, virtual models of running boards, wheels, tires, roof racks, grilles, and/or the like.

The electronic device 104 may include one or more components such as an imaging device (e.g., a camera), to capture images of one or more objects in a physical environment of the user. Additionally, the electronic device 104 may be configured to access a software application within which a trained machine learning model may be embedded. The electronic device 104 may, via a software application and the network 100, retrieve a multi-dimensional wireframe model for use in the augmented reality environment from the one or more databases associated with the server 103, as described in greater detail below. That is, the server 103 may include one or more databases, within which a plurality of data related to various characteristics of real world objects may be stored. In embodiments, the computing device 102 the data stored in these databases to associate a virtual object (e.g., a virtual component) with a portion of the virtual wireframe model such that the virtual object may appear precisely positioned on or integrated with a real-world object within the augmented reality environment.

Additionally, included in FIG. 1 is the electronic device 104. The electronic device 104 may be any mobile or personal computing device such as a laptop, tablet, smartphone, or the like that a user may use to capture image data of a physical real-world object they desire to customize virtually with virtual accessories, for example, in an effort to visualize what the accessory would look like on their vehicle. It is also understood that while the electronic device 104, the computing device 102, and the server 103, are depicted as individual devices, these are merely examples. More specifically, in some embodiments, any type of computing device (e.g., mobile computing device, personal computer, server, and the like) may be utilized for any of these components. Additionally, while each computing device is illustrated in FIG. 1 as a single piece of hardware, this is also an example.

Figure 2:
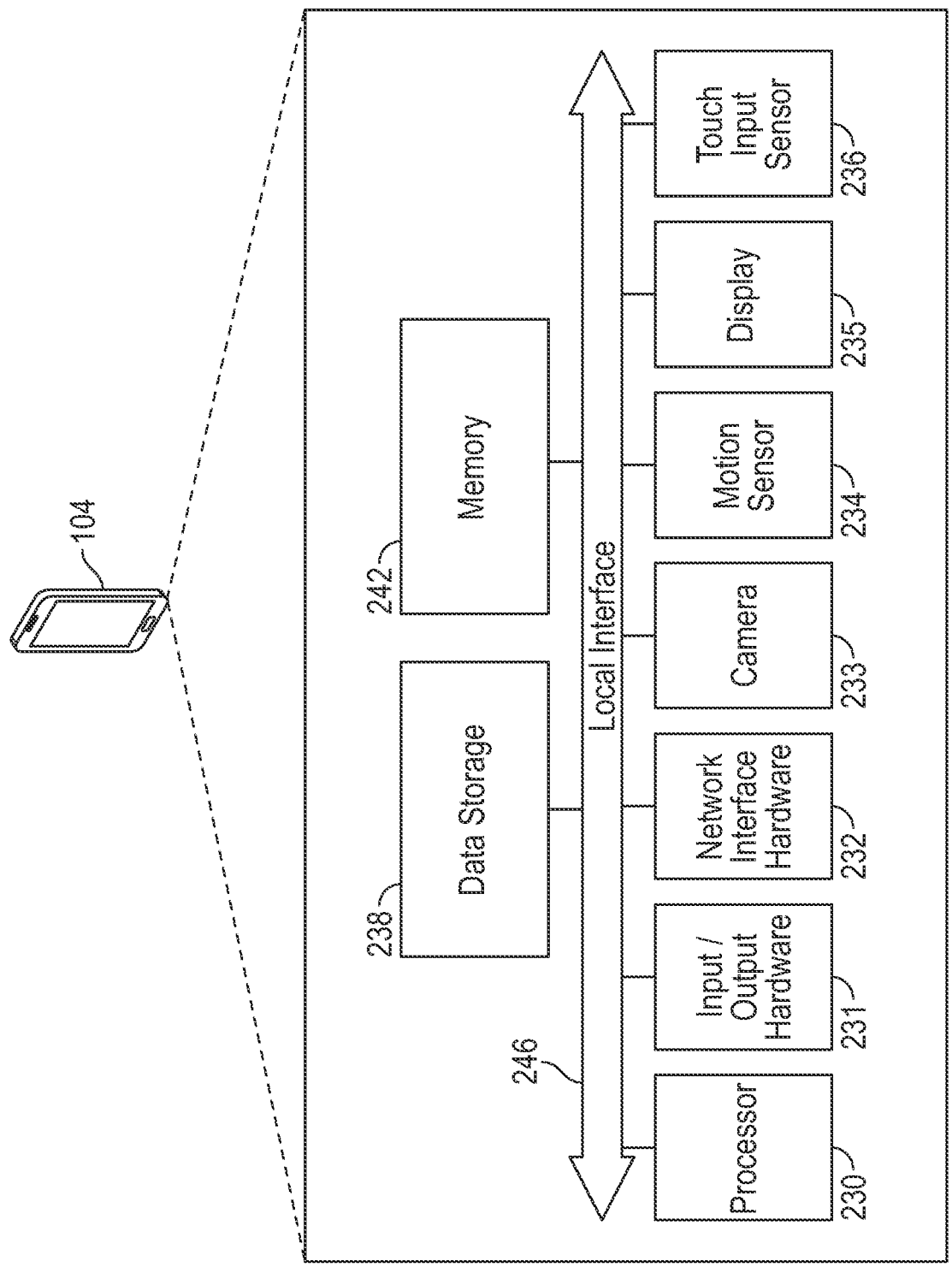
FIG. 2 schematically depicts an example electronic device for providing an augmented reality environment to a user, according to one or more embodiments described and illustrated herein.

FIG. 2 schematically depicts an example electronic device 104 for providing an augmented reality environment to a user, according to one or more embodiments described and illustrated herein. As illustrated in FIG. 2, the electronic device 104 may include a processor 230, input/output hardware 231, network interface hardware 232, a camera 233, a motion sensor 234, a display 235, a touch input sensor 236, a data storage component 238, which optionally stores one or more multi-dimensional wireframe models and/or virtual accessories (e.g., models of the virtual accessories) and a memory component 242. The memory component 242 may be machine readable memory (which may also be referred to as a non-transitory processor readable memory). The memory component 242 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component 242 may be configured to store operating logic and/or a machine learning model (ML model), each of which may be embodied as a computer program, firmware, or hardware, as an example.

A local interface 246 is also included in FIG. 2 and may be implemented as a bus or other interface to facilitate communication among the components of the electronic device 104. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 210. In some embodiments, the machine-readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The local interface 246 may be formed from any medium that is capable of transmitting a signal such as, for example, conductive wires, conductive traces, optical waveguides, or the like. Moreover, the local interface 246 may be formed from a combination of mediums capable of transmitting signals. In one embodiment, the local interface 246 comprises a combination of conductive traces, conductive wires, connectors, and buses that cooperate to permit the transmission of electrical data signals to components such as processors, memories, sensors, input devices, output devices, and communication devices. Accordingly, the local interface 246 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The local interface 246 communicatively couples the various components of the electronic device 104. As used herein, the term "communicatively coupled" means that coupled components are capable of exchanging data signals with one another such as, for example, electrical signals via conductive medium, electromagnetic signals via air, optical signals via optical waveguides, and the like.

The processor 230 may include any processing component(s) configured to receive and execute programming instructions (such as from the data storage component 238 and/or the memory component 242). The instructions may be in the form of a machine-readable instruction set stored in the data storage component 238 and/or the memory component 242. The input/output hardware 231 may include a monitor, keyboard, mouse, printer, microphone, speaker, and/or other device for receiving, sending, and/or presenting data. The network interface hardware 232 may include any wired or wireless networking hardware, such as a modem, LAN port, Wi-Fi card, WiMax card, mobile communications hardware, and/or other hardware for communicating with other networks and/or devices.

The processor 230 is communicatively coupled to the other components of the electronic device 104 by the local interface 246. Accordingly, the local interface 246 may communicatively couple any number of processors with one another, and allow the modules coupled to the local interface 246 to operate in a distributed computing environment. Specifically, each of the modules may operate as a node that may send and/or receive data.

The camera 233 may be any device having an array of sensing devices (e.g., pixels) capable of detecting radiation in an ultraviolet wavelength band, a visible light wavelength band, or an infrared wavelength band. The camera 233 may have any resolution. The camera 233 may be an omnidirectional camera, or a panoramic camera. In some embodiments, one or more optical components, such as a mirror, fish-eye lens, or any other type of lens may be optically coupled to camera 233. In embodiments, the camera 233 may have a broad angle feature that enables capturing digital content within a 150 degree to 180-degree arc range. Alternatively, the camera 233 may have a narrow angle feature that enables capturing digital content within a narrow arc range, e.g., 60 degrees to 90-degree arc range. In embodiments, the one or more cameras 233 may be capable of capturing high definition images in a 720-pixel resolution, a 1080-pixel resolution, and so forth. Alternatively, or additionally, the camera 233 may have the functionality to capture a continuous real time video stream for a predetermined time period.

The motion sensor 234 may include any device capable of detecting acceleration changes in the electronic device 104 and/or roll, pitch, and yaw rotations. For example, the motion sensors 234 may include an accelerometer, a gyroscope, or the like.

The display 235 may include any medium capable of transmitting an optical output such as, for example, a cathode ray tube, light emitting diodes, a liquid crystal display, a plasma display, a virtual reality headset or glasses, or the like. Moreover, the display 235 may be a touchscreen enabled by a touch input sensor 236 that, in addition to providing optical information, detects the presence and location of a tactile input upon a surface of or adjacent to the display 235.

It should be understood that the data storage component 238 may reside local to and/or remote from the electronic device 104 and may be configured to store one or more pieces of data for access by the electronic device 104 and/or other components. It should also be understood that the components illustrated in FIG. 2 are merely exemplary and are not intended to limit the scope of this disclosure. More specifically, while the components in FIG. 2 are illustrated as residing within the electronic device 104, this is merely an example. In some embodiments, one or more of the components may reside external to the electronic device 104. Similarly, while FIG. 2 is directed to the electronic device 104, other components such as the computing device 102 and the server 103 may include similar hardware, software, and/or firmware.

The network interface hardware 214 may include a chipset (e.g., antenna, processors, machine readable instructions, etc.) to communicate over wireless computer networks such as, for example, wireless fidelity (Wi-Fi), WiMax, Bluetooth, IrDA, Wireless USB, Z-Wave, ZigBee, or the like. In some embodiments, the network interface hardware 214 includes a Bluetooth transceiver that enables the electronic device 104 to exchange information with the server 103 via Bluetooth communication.

Figure 3:
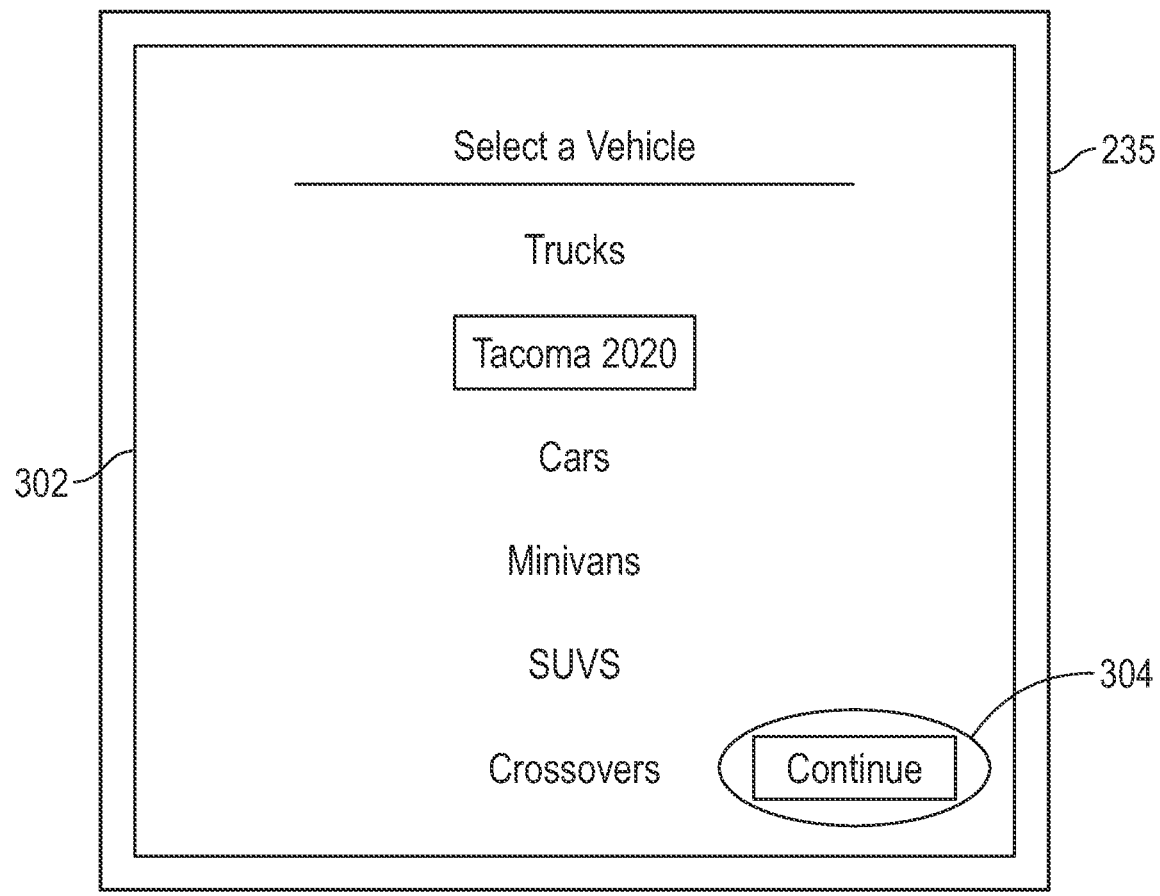
FIG. 3 depicts an example display providing an illustrative graphical user interface menu, according to one or more embodiments described and illustrated herein.
Figure 4:
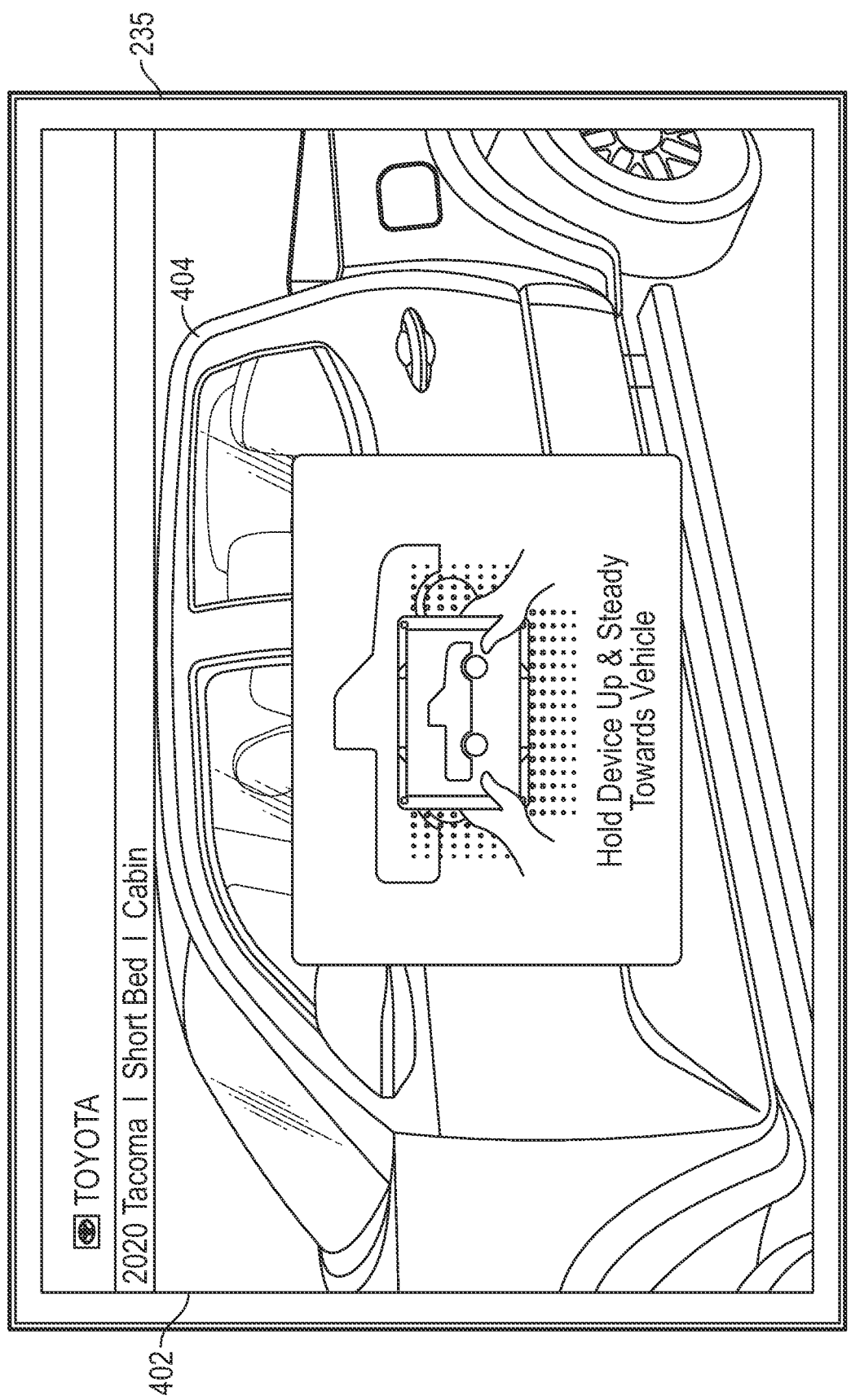
FIG. 4 depicts an illustrative instruction screen on the display of the device for identifying an object within the environment, according to one or more embodiments described and illustrated herein.

Referring now to FIGS. 3-12, illustrative walkthrough of the operation of the augmented reality system. FIG. 3 depicts an example home page 302 (e.g., a graphical user interface menu) displayed on a display 235 of the electronic device 104, according to one or more embodiments described and illustrated herein. In some embodiments, the example home page 302 may be displayed on the display 235 of the electronic device 104 responsive to a user accessing a software application, e.g., by clicking an icon displayed on a screen of the electronic device 104. In embodiments, the home page 302 may include a plurality of user selectable icons, e.g., such as "Trucks", "Cars", "Minivans", "SUVs", and "Crossovers", which correspond to various vehicle brands, makes, models, and the like. In some embodiments, a user may select a particular brand of truck, such as Tacoma 2020, and choose an icon labeled "Continue" to initiate operation of the augmented reality system described herein. Upon selection of the "Continue" icon, the processor 230 may instruct the software application to open an initiation page, as depicted in FIG. 4.

FIG. 4 depicts an initiation page displayed on a display 235 of the electronic device 104, according to one or more embodiments described and illustrated herein. In embodiments, a user may recognize the type of a vehicle located within a certain proximity of the user in a physical environment of the user, e.g., on the showroom floor of a car show, on the floor of a dealership, etc. Thereafter, in some embodiments, the user may choose the type of vehicle (e.g., a Truck) and select the "continue icon 302" from the example home page 302, as depicted in FIG. 3. In response, the processor 230 may instruct the software application to display an initiation page 402 on the display 235 of the electronic device 104. In embodiments, the initiation page 402 may include data related to various characteristics of the example vehicle 404, e.g., such as the year, make, and model of the vehicle. Additionally, in embodiments, the initiation page 402 may include a real-time video stream of the example vehicle 404 that is captured in the physical environment of the user. In other words, a live video stream of the example vehicle 404 as present in the physical environment of the user (e.g., on the floor of a car dealership). The data related to the characteristics of the example vehicle 404 may be displayed on the initiation page 402 adjacent to the live video stream (or an image) of the vehicle.

In embodiments, the initiation page may instruct a user to perform one or more actions relative to the example vehicle 404, e.g., place the camera 233 in a particular position, at a particular angle, and/or at a particular distance relative to the example vehicle 404.

The electronic device 104 may receive from the camera 233 image data of the environment including the vehicle 404. The electronic device 104 then processes the image data to identify a real-world object in the environment captured by the camera. For example, the electronic device 104 may implement a machine learning model to analyze the image data and determine the classification such as the brand, make, model, and or trim of the vehicle in the image data. The machine learning model may be trained using training images that include a variety of information related to different vehicles, e.g., colors, makes, models, size of vehicle wheels, vehicle brand logos, decals, number of doors in a vehicle, shapes, contours, and dimensions of vehicles, etc. Additionally, these training images may have been captured under different lighting and environmental conditions. These images may also include numerous labels corresponding to each of these vehicle characteristics. In embodiments, the training images may be input into a supervised machine learning environment that may include a supervised training interface in which an individual may add, delete, or modify these labels.

Additionally, in certain illustrative embodiments, upon completion of the training, the machine learning model may be configured to identify, in real time, one or more characteristics of a particular vehicle (e.g., dimensions, contours, etc.) from analyzing one or more perspective images of the vehicle that may be captured in the physical environment of the user. It is noted that a large number of training images, which include a substantial number and diversity of data related to various vehicles, results in a robustly trained machine learning model that is configured to efficiently and accurately identify the dimensions (and other characteristics) of a vehicle. In embodiments, the machine learning model may be trained using machine learning algorithms such as, e.g., OpenML or TensorFlow. Other machine learning algorithms with comparable characteristics are also contemplated.

Figure 5:
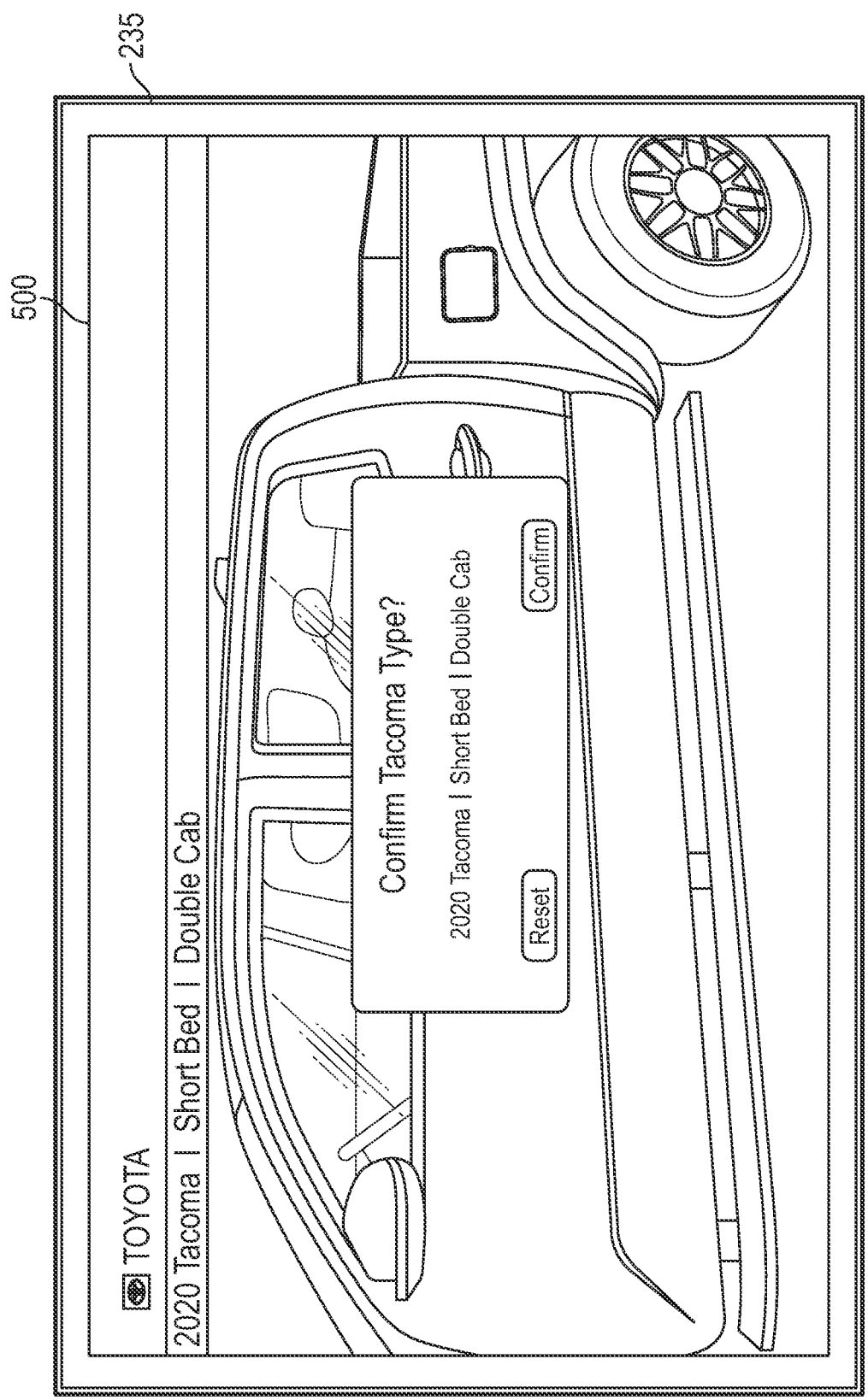
FIG. 5 depicts an illustrative confirmation menu on the display of the device for confirming identification of the object within the environment, according to one or more embodiments described and illustrated herein.

For example, upon placing the camera 233 in a particular position, a vehicle brand and model confirmation page 500, as depicted in FIG. 5, may also be displayed on the display 235. By selecting a prompt that is displayed, e.g., "confirm" icon, the user may manually classify the example vehicle 404 according to the vehicle's make and model. In some embodiments, the system described herein may automatically classify the example vehicle 404 as a 2020 Tacoma TRD, short bed, double cab truck utilizing a plurality of image recognition techniques. These techniques may involve analyzing the contours, dimensions, and other such features of the example vehicle 404 and performing a comparison of these features with one or more databases associated with the server 103, which stores features, dimensions, and contours of various vehicles in one or more databases. One or more machine learning techniques may also be utilized as part of the image recognition techniques to accurately and efficiently classify the example vehicle 404.

Figure 6:
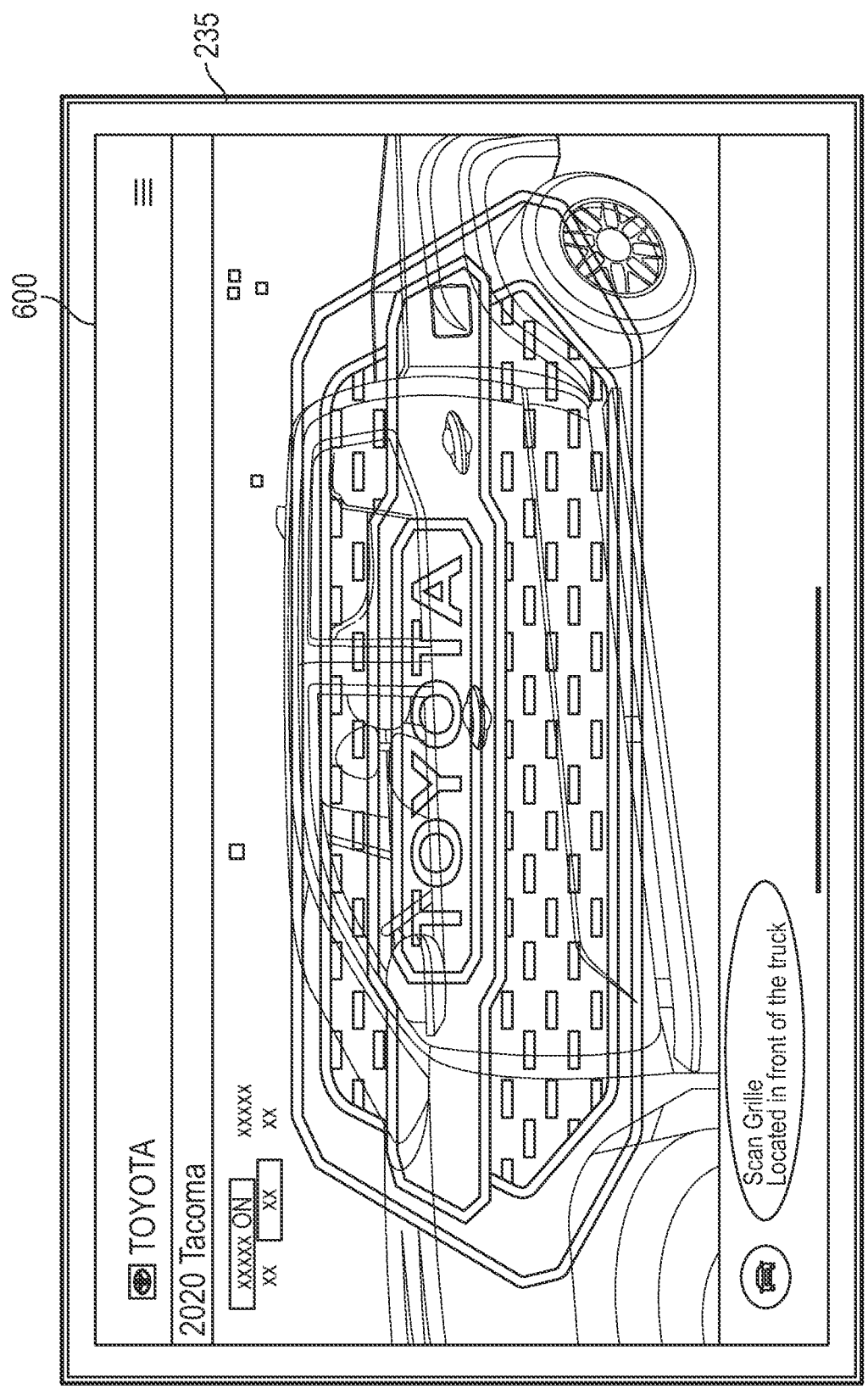
FIG. 6 depicts an example overlay of a registration feature for aligning with the real-world feature on the identified object in the real-world environment, according to one or more embodiments described and illustrated herein.

FIG. 6 depicts an example page in the display 235 in which a registration feature 600 such as virtual overlay of a grille is displayed, according to one or more embodiments described and illustrated herein. As illustrated in FIG. 6, the registration feature 600 may appear as overlaying or superimposed over portions of the example vehicle 404 located in the physical environment of the user. Specifically, the registration feature 600 may appear as overlaying a live video stream (or an image) of the example vehicle 404 located within the physical environment of the user. In embodiments, the simultaneous display of both the registration feature 600 in the virtual environment and the live video stream of the example vehicle 404 in the physical environment on the display 235 may be the augmented reality environment of the augmented reality system described herein. Within this augmented reality environment, a user may perform various actions relative to example vehicle 404, as depicted and described with reference to FIGS. 8-11.

The registration feature 600 may vary in shape, size, and dimensions, depending on the type and brand of a vehicle. The page on which the registration feature 600 appears may also include instructions for the user to perform certain actions with respect to the example vehicle 404, such as positioning the registration feature 600 near a front portion of the example vehicle 404. The front portion of the example vehicle 404 may include a grille shaped pattern that is similar to the registration feature 600. In embodiments, as depicted in FIG. 6, an instruction may read "Scan Grille Located In Front of the Truck".

Figure 7:
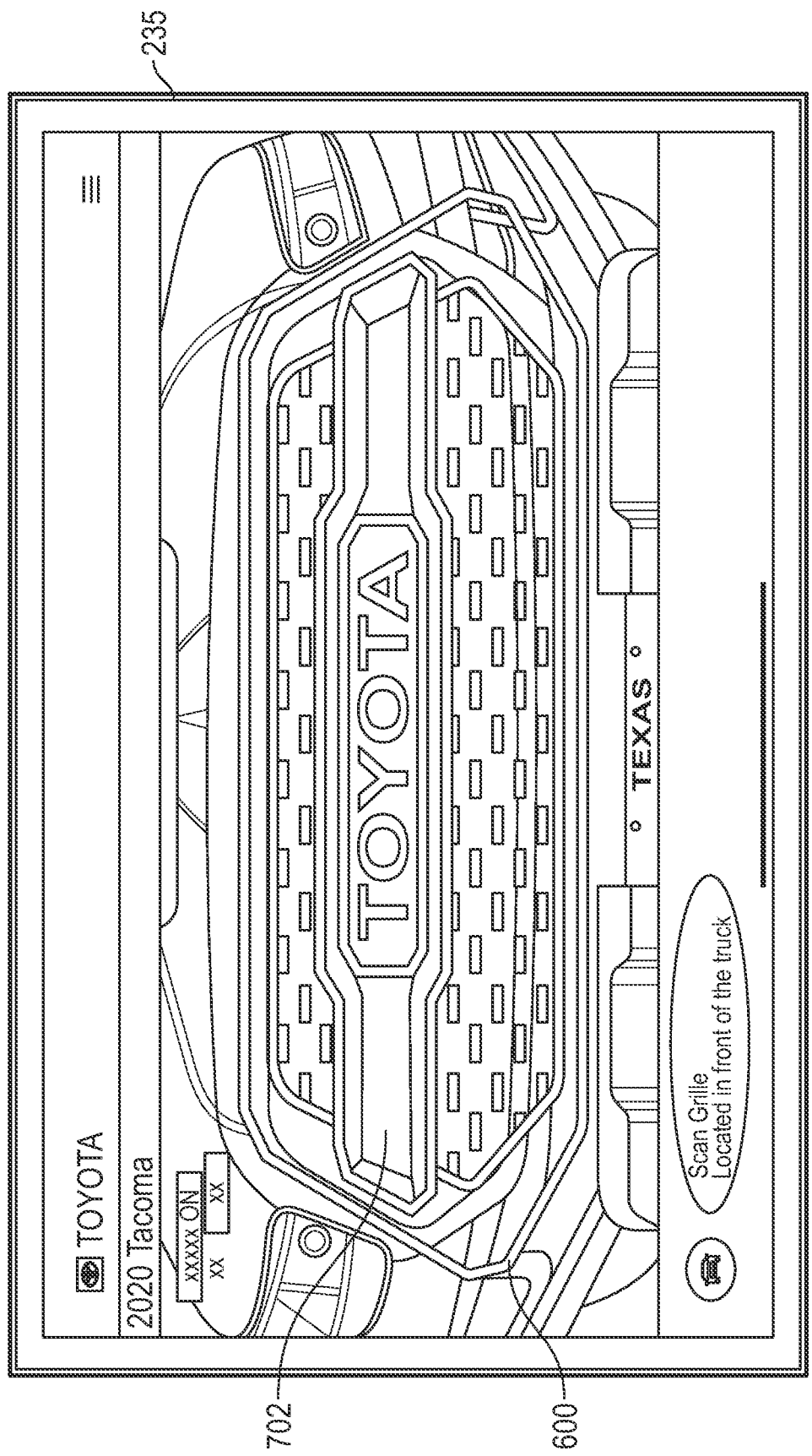
FIG. 7 depicts an illustrative example of the registration feature being aligned with the real-world feature on the identified object as displayed on the display of the device as a user orients the device to align the registration feature and the real-world feature, according to one or more embodiments described and illustrated herein.

FIG. 7 depicts a user positioning the camera 233 of the electronic device 104 in compliance with instructions displayed on a page of the display 235, according to one or more embodiments described and illustrated herein. Specifically, FIG. 7 depicts a user moving the electronic device 104 to align the registration feature 600 (e.g., a virtual image of the grille) with the grille shaped pattern 702 formed on the front of the example vehicle 404, e.g., based on instructions such as "Scan Grille Located In Front of the Truck". In embodiments, the registration feature 600 may remain stationary within an augmented reality environment on a page displayed on the user interface 300, while one or more objects appearing in the background of the display 235 (e.g., real world objects in the live video stream) may vary, e.g., based on movement of the electronic device 104. In embodiments, the user may move the electronic device 104 near a portion of the example vehicle 404 such that the registration feature 600 aligns with corresponding features such as the grille shaped pattern 702, as depicted in FIG. 7.

Upon alignment, the augmented reality system described herein may retrieve a virtual wireframe model within an augmented reality environment. In some embodiments, the virtual wireframe model may be generated by combining multiple wireframe model segments, which may be generated by analyzing perspective images of the example vehicle 404 in the physical environment. These perspective images may correspond with different orientations of the vehicle in the physical environment. Details regarding the manner in which the virtual wireframe model is generated and utilized will be described later on in this disclosure. Furthermore, the process of aligning a fixed sized registration feature with the corresponding feature on the vehicle enables the electronic device 104 to determine the dimensionality of the image data being received by the camera 233. The dimensionality may be continually updated through the motion of the electronic device 104 based on input from the one or more motion sensors 234 of the electronic device 104. In other words, the electronic device 104 is able to determine with a high degree of accuracy the real-world dimensions of the object within the image data based the alignment of the registration feature 600 which has known dimensions with the corresponding feature on the object. In the present example, this is the grille of the vehicle.

Figure 8:
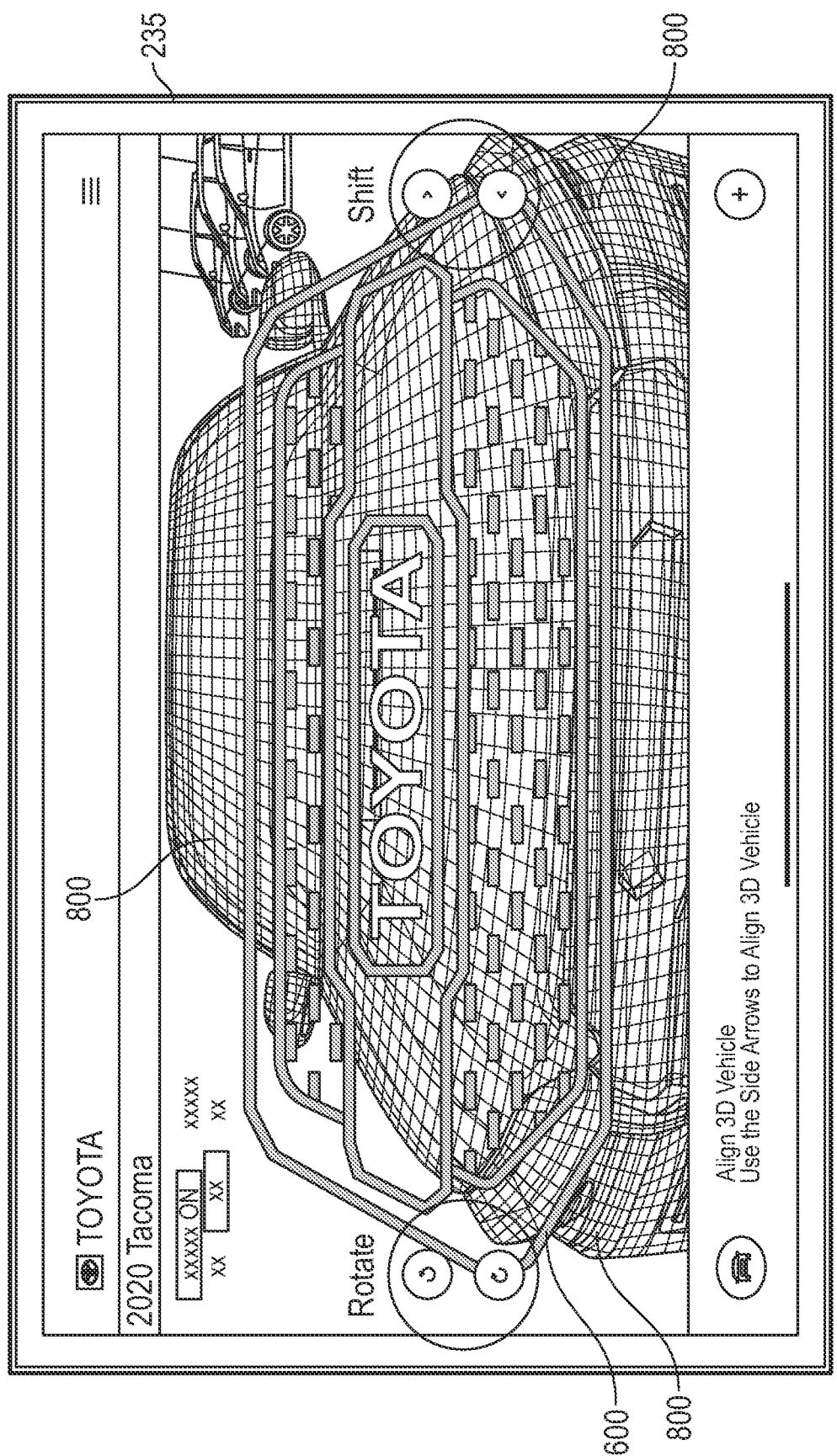
FIG. 8 depicts an illustrative example of a multi-dimensional wireframe model of the identified object being registered with the identified object within the real-world environment as captured by the imaging device of the device, according to one or more embodiments described and illustrated herein.

Once the electronic device 104 ascertains dimensionality data for the image data, the electronic device 104 may register a multi-dimensional wireframe model of the identified object with the real-world object being captured by the camera 233. For example, FIG. 8 depicts an illustrative example of a multi-dimensional wireframe model of the identified object being registered (i.e., correctly aligned) with the identified object within the real-world environment as captured by the imaging device, according to one or more embodiments described and illustrated herein. It should be understood that the multi-dimensional wireframe model may not be visible to the user on the display 235, but rather be hidden from view so that the user merely sees a real-time view of the vehicle as the user is instructed to move about the environment to capture additional perspectives of the object so that the electronic device 104 may accurately lock the multidimensional model to the real-world object.

In response to capturing various perspective images (a first perspective image) of the example vehicle 404, the processor 230 may identify additional features of the vehicle such as the front bumper, front head lights, front hood, and the back portions of the side view mirrors. These additional features may be correlated with the corresponding portions of the multi-dimensional wireframe model so that when virtual accessories are selected to be added to the vehicle in the augmented reality environment, they may be attached to the multi-dimensional wireframe model and continuous processing of the real-time image data can be avoided in order to accurately and seamlessly position the virtual accessory in the augmented reality environment with respect to its installation location on the vehicle. Other characteristics such as contours of the vehicle and the presence of various components on the vehicle, may also be identified by the processor 230 using the trained machine learning model. Thereafter, using these dimensions, the processor 230 may associate the multi-dimensional wireframe model 800 with the real-world representation of the object. As depicted in FIG. 8, the multi-dimensional wireframe model 800 appears to overlay the front bumper, front head lights, front hood, and the back portions of the example vehicle 404. These portions are located in the first perspective image of the example vehicle 404. Corresponding portions of the multi-dimensional wireframe model 800 may mapped onto the contours of the example vehicle 404.

In some embodiments, the multi-dimensional wireframe model 800 may not be visible to a user, but nonetheless overlay the front portions of the vehicle, as described above. Additionally, in some embodiments, a graphical user interface may be displayed having manual controls for adjusting the multi-dimensional wireframe model 800. The graphical user interface may include icons such as "rotate" and "shift". When selected, these icons enable a user to modify the position of the multi-dimensional wireframe model 800 relative to the example vehicle 404 within the augmented reality environment. The page displayed in the display 235 may also include instructions for the user to align the camera 233 to capture image data of another portion of the vehicle. For example, instructions may be for the user to align the camera 233 to capture image data of the side mirror adjacent to the driver seat.

Figure 9:
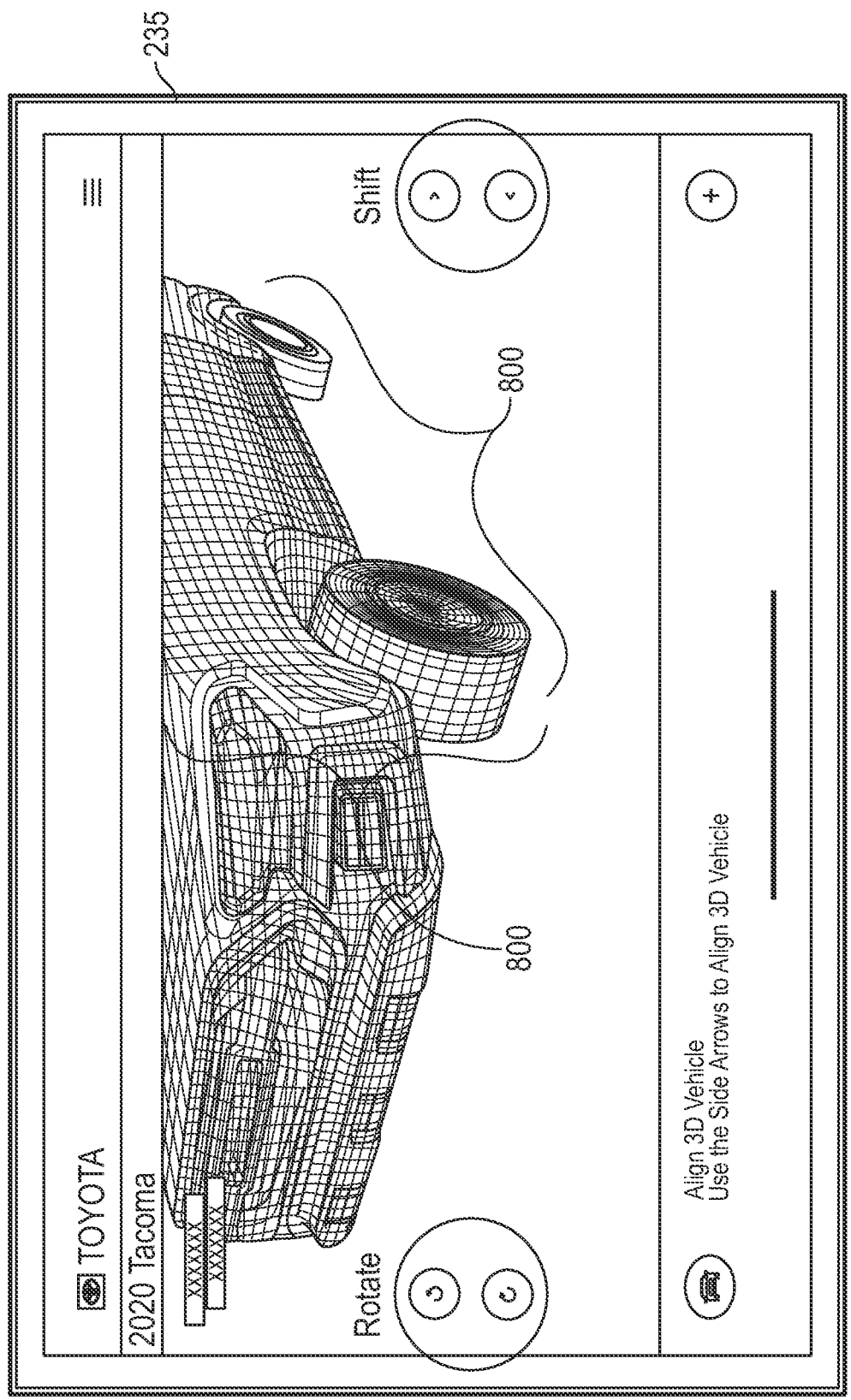
FIG. 9 depicts another illustrative view of the multi-dimensional wireframe model being registered with the identified object within the real-world environment as additional points of view of the identified object are captured by the imaging device of the device, according to one or more embodiments described and illustrated herein.

FIG. 9 depicts another portion of the multi-dimensional wireframe model 800 overlaying the driver side portions of the example vehicle 404, according to one or more embodiments described and illustrated herein. Specifically, in compliance with the above described instructions, the user may align the camera 233 with the side mirror adjacent to the driver seat. Thereafter, another perspective image (e.g., a second perspective image) corresponding to another orientation of the example vehicle 404 in the physical environment of the user may be captured. For example, the captured image may include areas ranging from the front right headlight to the back right-tire of the vehicle and areas from the bottom of the front and back right tires to the top portion of the example vehicle 404 on the driver side. Thereafter, the processor 230 may identify dimensions of the example vehicle 404 specific to these areas. Using these dimensions, the processor 230 may associate this additional portion of the multi-dimensional wireframe model 800 with the image data of the real-world environment. The multi-dimensional wireframe model 800 may overlay and map to corresponding areas of the example vehicle 404 included in the second perspective image, e.g., portions from the bottom of the front and back tires to the top portion on the driver side of the example vehicle 404.

Figure 10:
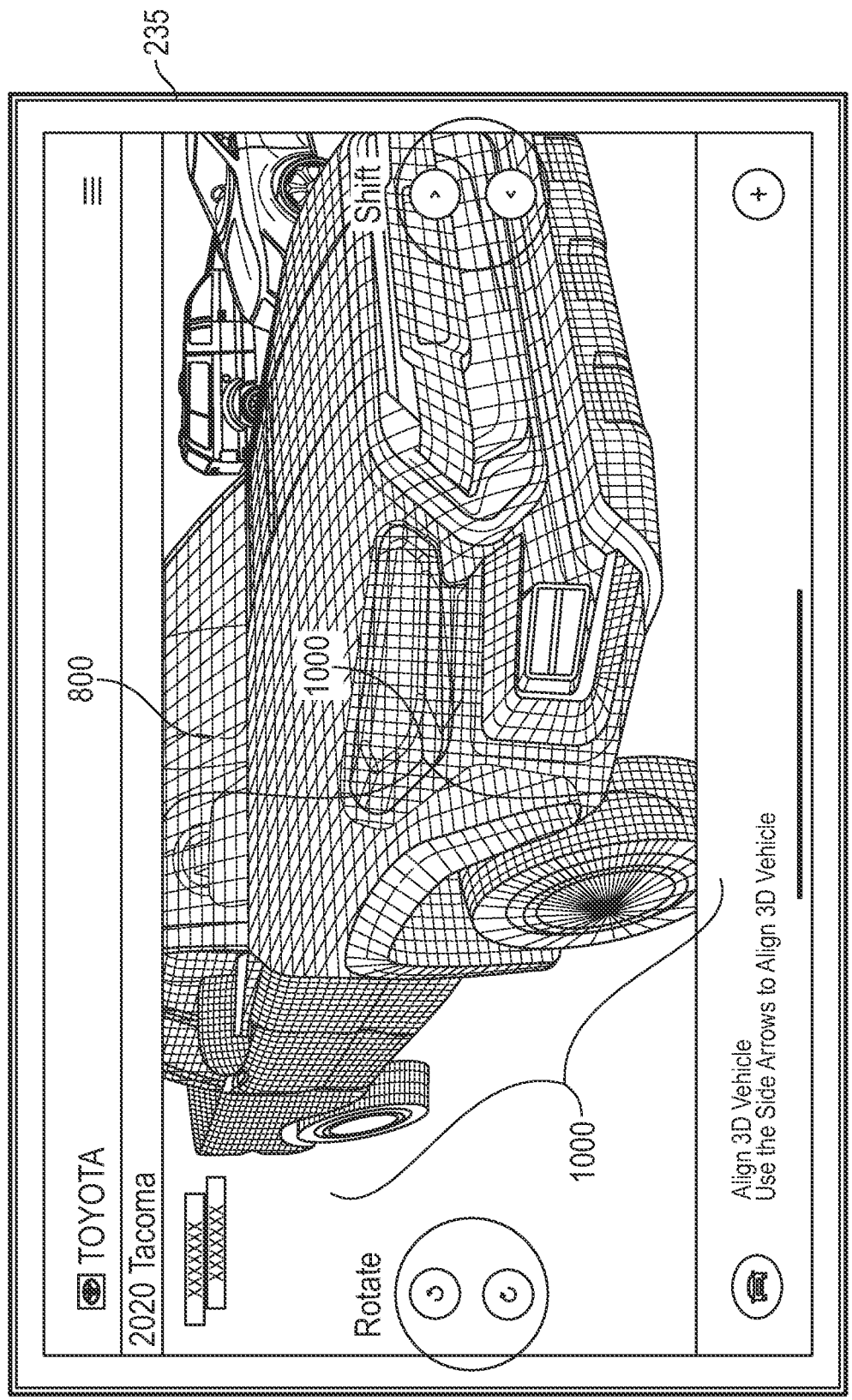
FIG. 10 depicts another illustrative view of the multi-dimensional wireframe model being registered with the identified object within the real-world environment as additional points of view of the identified object are captured by the imaging device of the device, according to one or more embodiments described and illustrated herein.

FIG. 10 depicts another illustrative view of the multi-dimensional wireframe model 800 being registered (i.e., correctly aligned) with the identified object within the real-world environment as additional points of view of the identified object are captured by the imaging device of the device, according to one or more embodiments described and illustrated herein. Specifically, in compliance with certain instructions displayed on the display 235, the user may align the camera 233 with the side mirror adjacent to the passenger seat. Thereafter, another image (e.g., a third perspective image) corresponding to another orientation of the example vehicle 404 may be captured, namely an image that includes the areas ranging from the front left headlight to the back-left tire and areas from the bottom of these tires to the top portion on the passenger side of the example vehicle 404. Thereafter, the processor 230 may, using the machine learning trained model accessible via the software application, identify dimensions of the example vehicle 404 specific to these areas. Using these dimensions, the processor 230 may map the corresponding portions of the multi-dimensional wireframe model 800 to the real-world vehicle captured in the image data. That is, the multi-dimensional wireframe model 800 may be a three-dimensional spatial model that is mapped onto the contours of the vehicle corresponding to the passenger side portions of the example vehicle 404.

Figure 11:
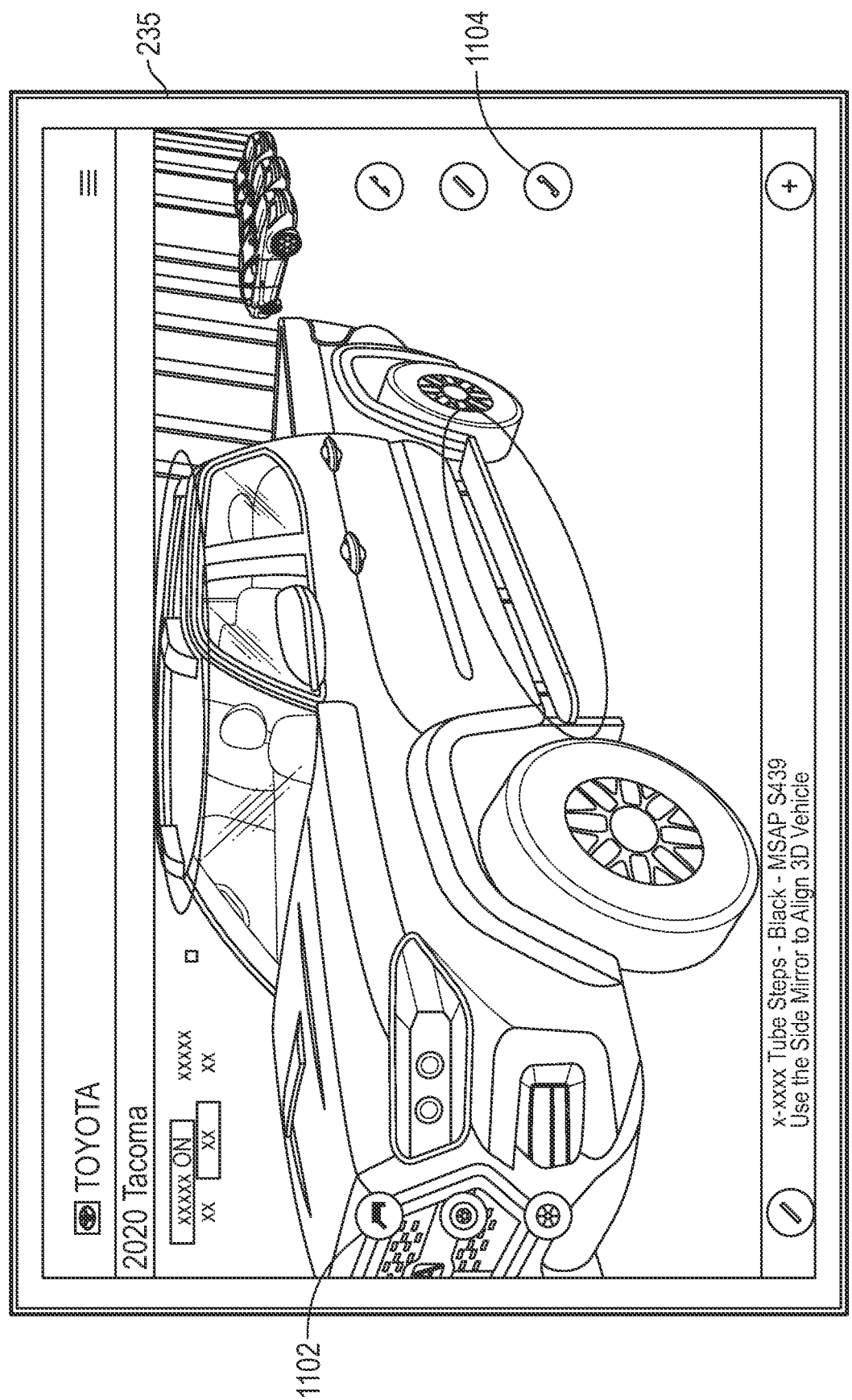
FIG. 11 depicts an example virtual accessory corresponding to the identified object being presented as a seamless component added to the identified object within the real-world environment on the display of the device within an augmented reality environment, according to one or more embodiments described and illustrated herein.

Once the multi-dimensional wireframe model 800 is registered (i.e., correctly aligned) to the real-world vehicle captured in the image data as depicted in FIG. 10, the electronic device 104 is ready to begin attaching virtual accessories to the multi-dimensional wireframe model and display them to the user in the augmented reality environment presented on the display 235. FIG. 11 depicts an example virtual accessory corresponding to the identified object being presented as a seamless component added to the identified object within the real-world environment on the display of the device, according to one or more embodiments described and illustrated herein. For example, the system described herein may display a vehicle add-on features page so the user may select one or more accessories to be installed virtually on the vehicle. The display 235 may include a plurality of symbols corresponding to various vehicle components, e.g., rims, running boards, etc. Each of these symbols may be selectable. In embodiments, upon selection of a symbol corresponding to a virtual component (e.g., a vehicle component) from the vehicle add-on features page on the display 235, the system described herein may attach the virtual component to the corresponding portion of the multi-dimensional wireframe model 800. It is noted that the multi-dimensional wireframe model 800 may overlay all portions of a live video stream of the example vehicle 404 in the physical environment of the user, and both the multi-dimensional wireframe model 800 and the live video stream of the example vehicle 404 may simultaneously be displayed on the display 235 (i.e. the augmented reality environment). In this way, the virtual accessory may also be displayed within the augmented reality environment.

Still referring to FIG. 11, symbols 1102 and 1104 associated a roof rack and a running board may be selected. In response, the processor 230 may, automatically and without user intervention, attach (or instruct the software application to attach) virtual components associated with the roof rack and the running board onto a portion of the multi-dimensional wireframe model 800. Thereafter, these virtual components may appear to overlay an area on the roof of the example vehicle 404 and the area in between the front right and back right tires of the vehicle within the augmented reality environment. Additionally, as illustrated, these components are displayed on portions of the vehicle such that the virtual components appear realistic and well-integrated with the example vehicle 404 in the augmented reality environment. Primarily because the virtual components correspond to specific portions of the multi-dimensional wireframe model 800, which in turn has been generated, using the trained machine learning model, so as to accurately fit the contours and dimensions of the example vehicle 404. In this way, any virtual components associated with various vehicle add-on features appear as if these components were real world objects installed on the example vehicle 404 within the physical environment of the user.

In some embodiments, a user may select a virtual accessory associated with a vehicle (e.g., a vehicle add-on accessory), a version of which may already be installed on the example vehicle 404. For instance, the example vehicle 404 may include a running board, and the user may select a running board of a different brand with different dimensions. In response, the system described herein may attach the selected virtual accessory (e.g., the virtual running board) onto the multi-dimensional wireframe model 800 such that the selected virtual running board may be displayed over a current running board within the augmented reality environment. To provide a user with a realistic view of the manner in which the selected running board may appear on the example vehicle 404, e.g., once it is installed on the vehicle, the system may utilize one or more occlusions (e.g., digital occlusions). These occlusions may be generated near locations on the multi-dimensional wireframe model in which the virtual component is attached and serve the purpose of preventing aspects of the currently installed running board from being displayed. In this way, the system described herein presents users with a display of a virtual component within an augmented reality environment such that the user may perceive the virtual component as accurately installed on a real-world object, namely the example vehicle 404 within the physical environment of the user.

Figure 12:
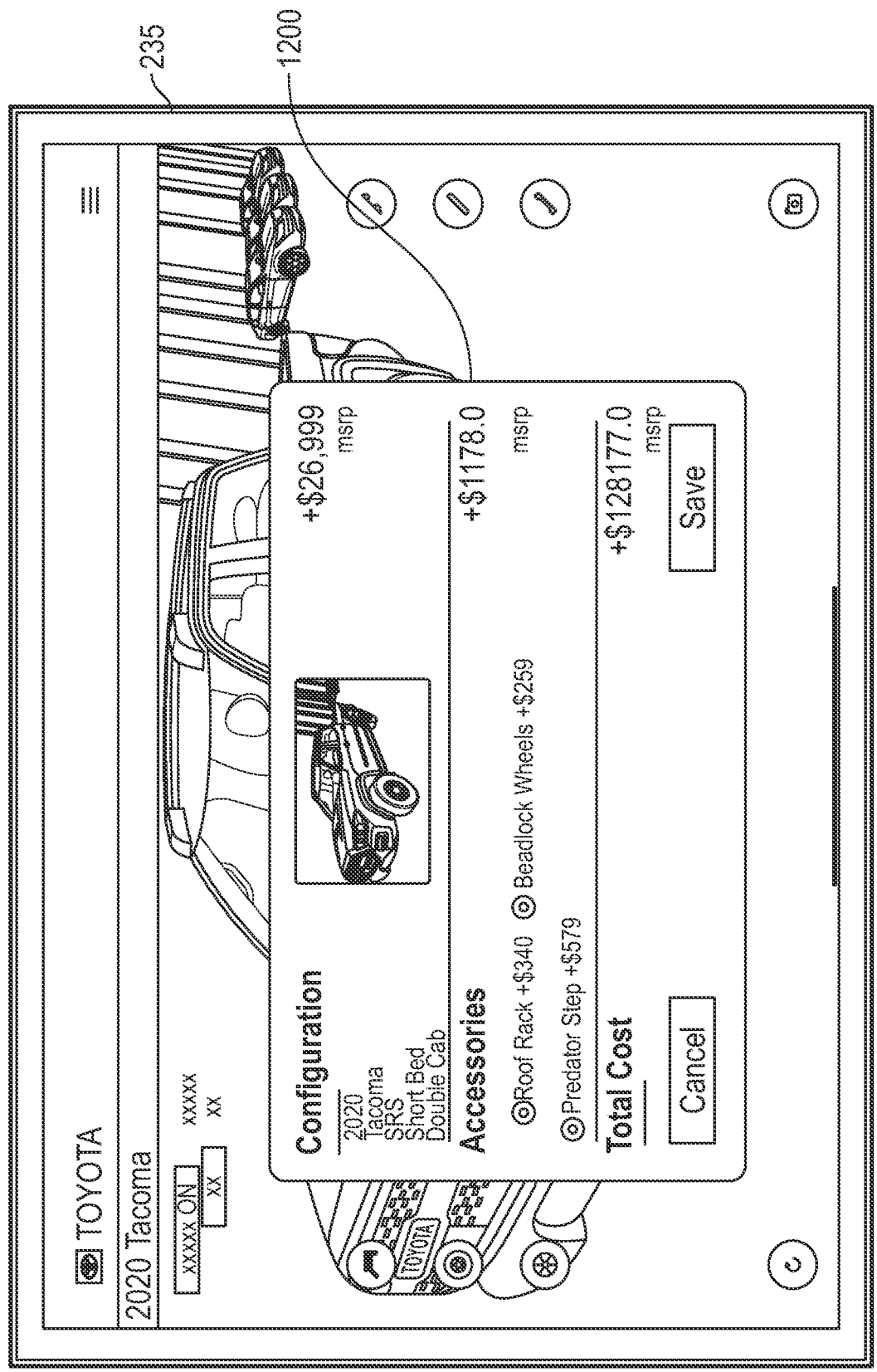
FIG. 12 depicts an example quote for the object and the selected accessories depicted in the augmented reality environment presented on the display of the device, according to one or more embodiments described and illustrated herein.

FIG. 12 schematically depicts an example quote for the object and the selected accessories depicted in the augmented reality environment presented on the display of the device, according to one or more embodiments described and illustrated herein. For example, after a user selects one or more virtual accessories, and these virtual accessories are displayed accurately and realistically on various parts of the example vehicle 404, the system described herein may display a configuration page that lists various types of information related to the example vehicle 404. For example, the configuration page may list the year, make, and model of the example vehicle 404, various vehicle add-features (e.g., virtual components associated with these features may have been displayed as overlaying the example vehicle 404 in the augmented reality environment), and the total cost or purchase price (e.g., pricing information) associated with the example vehicle 404. Additionally, the user may be provided with an option to save the vehicle and the selected vehicle add-on features. In some embodiments, images of the example vehicle 404 with the one or more virtual components included on these images may be saved.

Figure 13:
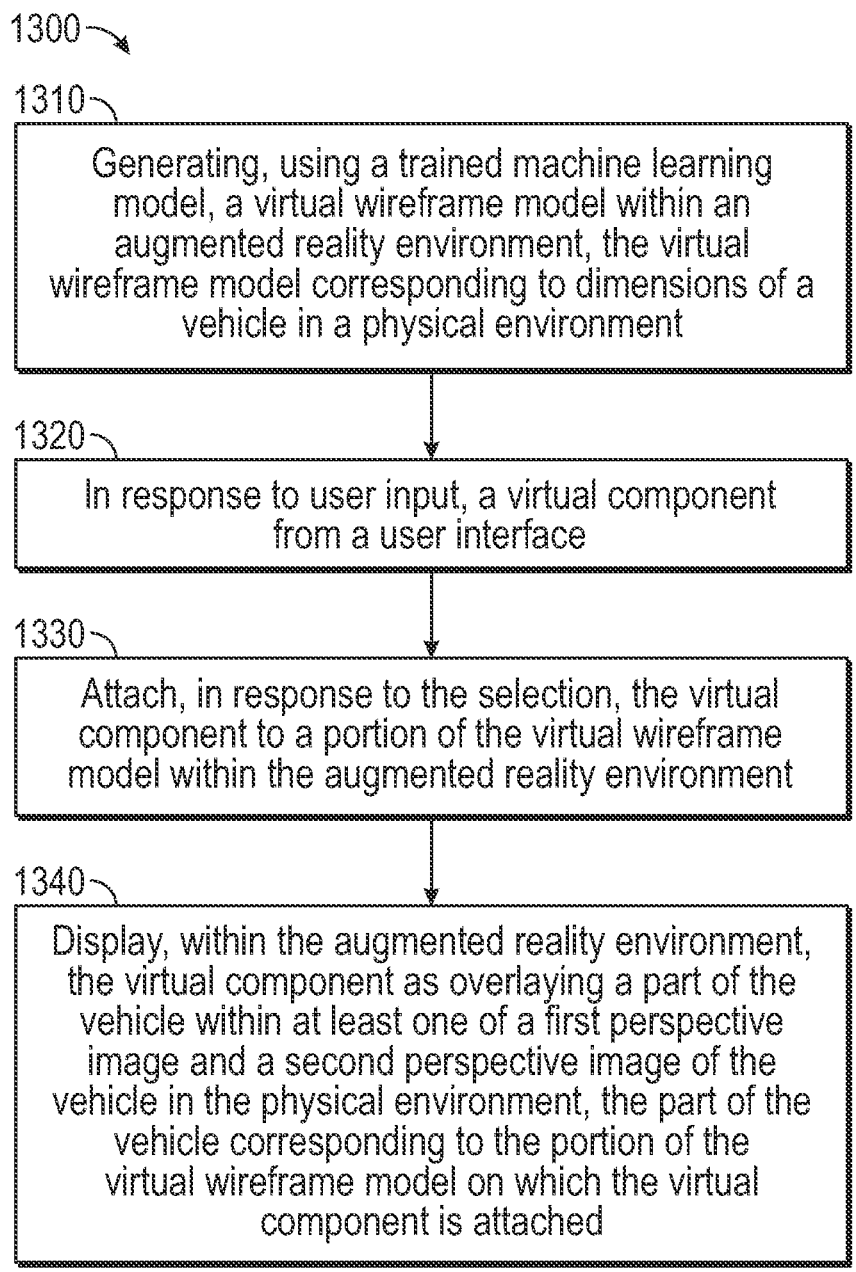
FIG. 13 depicts an illustrative flow diagram of a method for facilitating an accurate, precise, and seamless presentation of a virtual accessory added to the identified object within the real-world environment on the display of the device in the augmented reality environment, according to one or more embodiments described and illustrated herein.

FIG. 13 depicts an illustrative flow diagram 1300 of a method for facilitating an accurate, precise, and seamless presentation of a virtual accessory added to the identified object within the real-world environment on the display of the device in the augmented reality environment, according to one or more embodiments described and illustrated herein. At block 1310, the processor 230 may generate, using a trained machine learning model, the multi-dimensional wireframe model 800 within an augmented reality environment. The multi-dimensional wireframe model 800 may correspond to dimensions of a vehicle in a physical environment of the user. In some embodiments, the processor 230 may use the trained machine learning model to analyze the subject matter of perspective images of the example vehicle 404 that may be captured from different orientations. These images may be analyzed, using the trained machine learning model, to identify various dimensions of the vehicle. Thereafter, the processor 230 may (or instruct the software application to) map three-dimensional spatial models onto one or more areas of the vehicle included in the perspective images. In this way, the multi-dimensional wireframe model 800 corresponding to the identified object may be retrieved.

At block 1320, the processor 230 may enable a user to select a virtual component by selecting a symbol associated with the virtual component that is included on a page displayed on the display 235 of the electronic device 104. In embodiments, the user input may be based on a user clicking the symbol via an external device (e.g., a mouse), or by choosing the symbol using the user's fingers. At block 1330, in response to the selection, the processor 230 may attach the virtual accessory to a portion of the multi-dimensional wireframe model 800 within the augmented reality environment. Thereafter, at block 1340, the processor 230 may display, within the augmented reality environment, the virtual component as overlaying a part the vehicle within at least one of a first perspective image and a second perspective image of the vehicle in the physical environment. It is noted that the part of the vehicle may correspond to the portion of the multi-dimensional wireframe model 800 on which the virtual component is attached.

Figure 14:
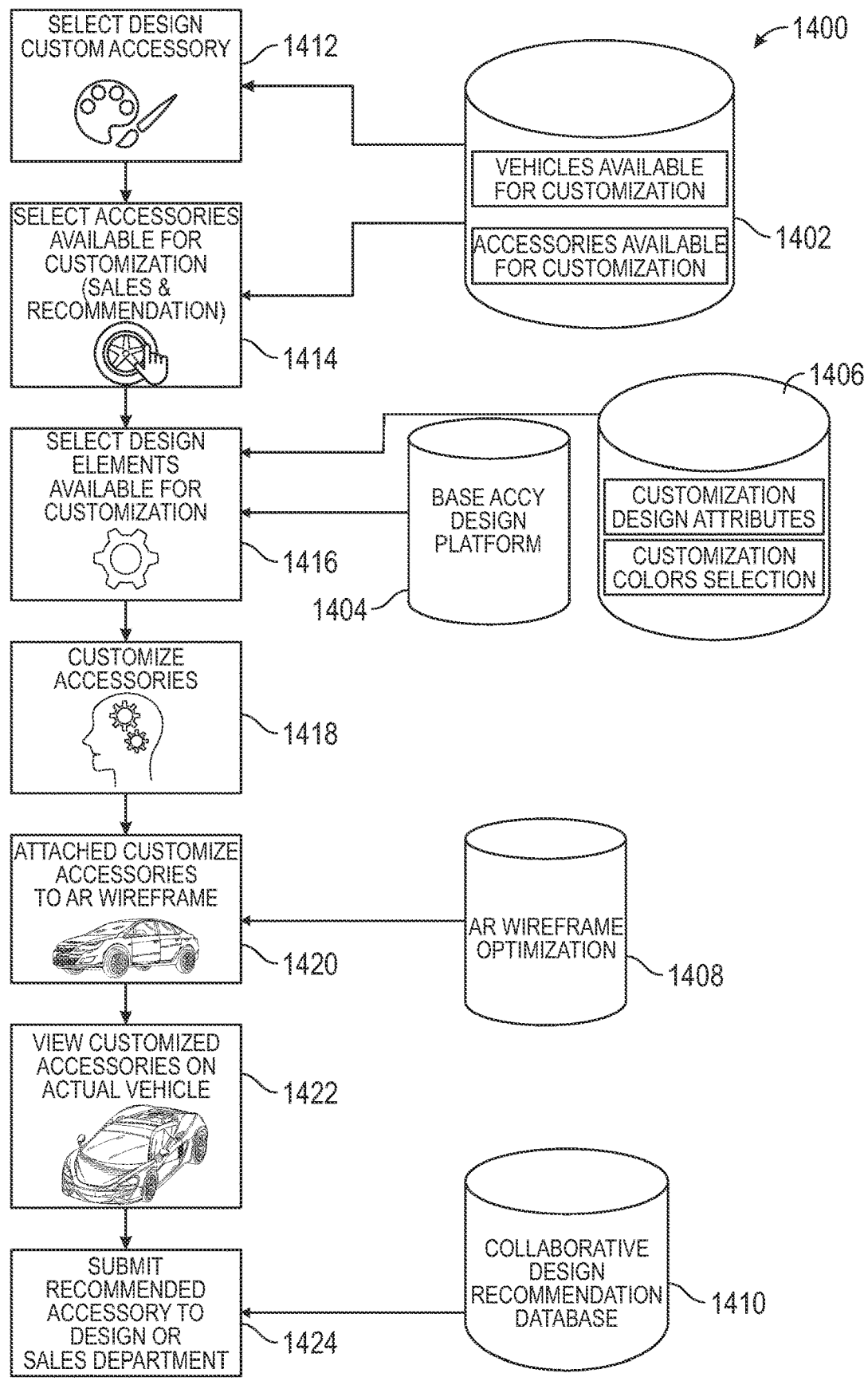
FIG. 14 is a block diagram of a system and flow diagram for the collaborative design and customization of various accessories of vehicles, according to certain illustrative embodiments of the present disclosure.

In yet other alternative illustrative embodiments of the present disclosure, the virtual automotive accessories may be customized and locked onto the real-world vehicles in the physical environment. FIG. 14 is a block diagram of a system 1400 and flow diagram for the collaborative design and customization of various accessories of vehicles. System 1400 may be used in conjunction with any of the computing networks described herein, such as the computing network or devices of FIG. 1 or 2. In addition, system 1400 may include a database 1402 that includes data related to the vehicles available for customization and the accessories available for customization. Another database 1404 is included that stores data related to baseline automotive accessories, which are basic, generalized accessory designs that may be modified in a variety of ways, as will be described below.

Database 1406 includes data related to color and design attributes/characteristics of the baseline accessories that can be customized. In certain embodiments, these characteristics may include the shape, material used, color, logo, texture, angle, slope or dimensions of the baseline accessories. Database 1408 includes the software and data necessary to achieve the wireframe modeling described herein to optimize the attachment of the virtual accessories to the physical vehicle in the augmented reality environment. Database 1410 stores data related to the customized designs of various users and provides the data retrieval for the aggregation functionality described herein.

Still referring to FIG. 14, database 1402 is used in conjunction with the selection of the accessory desired to be customized at block 1412. Database 1402 will include all accessories available for sale. In addition, although not shown, database 1402 may be in communication with database 1410 in order to retrieve recommended accessory designs and/or other accessories which have previously been customized by other users. Such accessories and/or their customized designs may be recommended to the users at block 1414.

Databases 1404 and 1406 work in conjunction with block 1416 where certain elements of the selected accessory (e.g., a baseline accessory or a pre-customized recommended accessory) is selected for customization. For example, that element (or characteristic) may be the color of the accessory. In other examples, it may the texture of the material used to make the accessory, etc. In yet other examples, the element may be the slope of a surface or an angle of the accessory. At block 1418, the customization is performed via, for example, a user display of the interactive system 1400.

At block 1420, system 1400 then attaches the customized accessory to the physical vehicle in the augmented reality environment via, for example, the wireframe modeling described herein. The customized accessory can then be viewed on the actual vehicle in the augmented reality environment, at block 1422 via the user device. At block 1424, system 1400 may then transmit the finalized accessory to a design or sales department of the vehicle manufacturer, where the information is stored in database 1410. In certain examples, the finalized designs may be aggregated from multiple users and used to determine which designs are worthy of manufacturing, hence the collaborative aspect of the present disclosure. For example, if a certain threshold number of accessories are sought to be customized, the system 1400 may determine that accessory is worthy of being offered for customization (e.g., based on profitability). In other examples, user customizations may be recommended to other users based upon their profiles or related characteristics. Thereafter, system 1400 may communicate the decision (yes or no) to the user via a user device to inform the user if their selected accessory can be customized or not.

Figure 15:
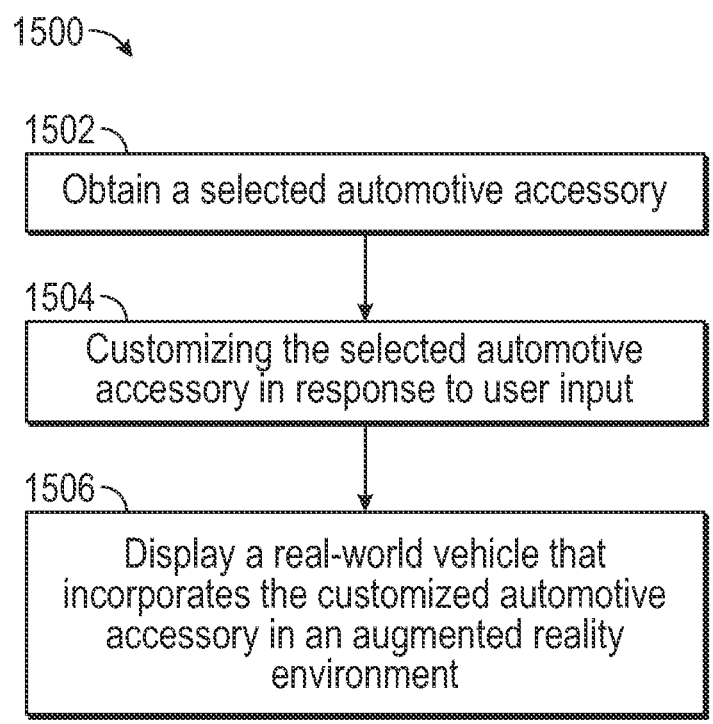
FIG. 15 is a flow chart of a method for customizing and displaying accessories in an augmented reality, according to certain illustrative methods of the present invention.

FIG. 15 is a flow chart of a method 1500 for customizing and displaying accessories in an augmented reality, according to certain illustrative methods of the present invention. At block 1502, the system first obtains a selected automotive accessory that corresponds to a physical (real-world) vehicle. For example, the user may be on site at a vehicle sales lot and viewing a physical vehicle on the lot through a viewing lens of the user's device. The user may then select, via his customer device through an application, an accessory available for customization that corresponds to that vehicle.

At block 1504, the system then interactively allows the user to customize the automotive accessory as described herein. In certain examples, the color, shape, material, dimensions, texture, angle or slope of various elements of the accessory may be altered and customized for the user. For example, in certain embodiments, system 1400 displays (on the user device) a baseline generic accessory (e.g., grille). The grille will have a number of elements which can be customized such as, for example, the dimension, material, etc. of the grille.

In yet other examples, system 1400 may recommend other customized designs selected by other use. In other examples, system 1400 may analyze the user's profile to find related profiles of other users and recommend designs selected by those related users. Once the customization has concluded, the system then displays (via a display of the user device) the customized automotive accessory overlaid on the physical vehicle.

With reference to FIGS. 14 and 15, thereafter, the user may save or otherwise enter the finalized customized accessory. The system 1400 may then evaluate the accessory to determine if it can be produced. Such analysis may include transmitting the finalized design to a sales or design team. In other examples, the system 1400 may compare the design to other designs requested by other users to determine if there is sufficient demand to justify production of the accessory. Here, system 1400 may aggregate the number of related or same customized accessories requested by other users and, based upon the aggregate number, determine if the accessory is cost efficient to produce. In other embodiments, a threshold number of customer requests must have been received in order to approve the user's customized design.

Furthermore, any of the illustrative methods described herein may be implemented by a system comprising processing circuitry or a non-transitory computer readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A computer-implemented method for displaying vehicle accessories in an augmented reality environment, the method comprising:
   generating an image of a real-world physical vehicle in an augmented reality environment;
   obtaining a selection of a virtual automotive accessory corresponding to the physical vehicle;
   in response to user input, customizing the automotive accessory for the physical vehicle; and
   displaying the customized automotive accessory to the user in an augmented reality environment such that the customized automotive accessory is overlaid atop the physical vehicle,
   wherein customizing the automotive accessory comprises recommending customizations to the user based upon profiles of other users.

2. The computer-implemented method as defined in claim 1, further comprising determining whether the customized automotive accessory can be produced.

3. The computer-implemented method as defined in claim 1, further comprising:
   aggregating customized automotive accessories from multiple users; and
   based upon the aggregate customized automotive accessories, determining which customized automotive accessories can be produced.

4. The computer-implemented method as defined in claim 1, wherein customizing the automotive accessory comprises:
   displaying a baseline automotive accessory to the user via a user device, wherein the baseline automotive accessory has characteristics which can be adjusted within predetermined tolerances;
   obtaining, via the user device, characteristics selected by the user; and
   based upon the selected characteristics, generating the customized automotive accessory.

5. The computer-implemented method as defined in claim 4, wherein the characteristics can include one or more of a shape, material, color, texture, angle, slope or dimension of the baseline automotive accessory.

6. The computer-implemented method as defined in claim 1, wherein the augmented reality environment is viewed through a viewing lens of the user device.

7. A system for displaying vehicle accessories in an augmented reality environment, the system comprising:
   a processor to perform operations comprising:
      generating an image of a real-world physical vehicle in an augmented reality environment;
      obtaining a selection of a virtual automotive accessory corresponding to the physical vehicle;
      in response to user input, customizing the automotive accessory for the physical vehicle; and
      displaying the customized automotive accessory to the user in an augmented reality environment such that the customized automotive accessory is overlaid atop the physical vehicle,
      wherein customizing the automotive accessory comprises recommending customizations to the user based upon profiles of other users.

8. The system as defined in claim 7, further comprising determining whether the customized automotive accessory can be produced.

9. The system as defined in claim 7, further comprising:
   aggregating customized automotive accessories from multiple users; and
   based upon the aggregate customized automotive accessories, determining which customized automotive accessories can be mass produced.

10. The system as defined in claim 7, wherein customizing the automotive accessory comprises:
    displaying a baseline automotive accessory to the user via a user device, wherein the baseline automotive accessory has characteristics which can be adjusted within predetermined tolerances;
    obtaining, via the user device, characteristics selected by the user; and
    based upon the selected characteristics, generating the customized automotive accessory.

11. The system as defined in claim 10, wherein the characteristics can include one or more of a shape, material, color, texture, angle, slope or dimension of the baseline automotive accessory.

12. The system as defined in claim 7, wherein the augmented reality environment is viewed through a viewing lens of the user device.

13. A method for displaying vehicle accessories in an augmented reality environment, the method comprising:
    obtaining, from a user via a user device, a customized automotive accessory corresponding to a real-world physical vehicle; and
    displaying the customized automotive accessory to the user in an augmented reality environment such that the customized automotive accessory is overlaid atop the physical vehicle,
    wherein customizing the automotive accessory comprises recommending customizations to the user based upon profiles of other users.

14. The method as defined in claim 13, wherein obtaining the customized automotive accessory comprises:
    uploading a pre-customized automotive accessory to the user device; or
    in response to user input, customizing the automotive accessory using selections of the user inputted via the user device.

15. The method as defined in claim 13, further comprising:
    determining whether the customized automotive accessory can be produced; or
    aggregating customized automotive accessories from multiple users, and based upon the aggregate customized automotive accessories, determining which customized automotive accessories can be produced.

16. The method as defined in claim 13, wherein customizing the automotive accessory comprises:
    displaying a baseline automotive accessory to the user via a user device, wherein the baseline automotive accessory has characteristics which can be adjusted within tolerances;
    obtaining, via the user device, characteristics selected by the user; and
    based upon the selected characteristics, generating the customized automotive accessory.

17. The method as defined in claim 13, wherein customizing the automotive accessory comprises recommending customizations to the user.

18. The method as defined in claim 16, wherein the augmented reality environment is viewed through a viewing lens of the user device.

* * * * *